US012578997B2

(12) United States Patent
Gutierrez et al.

(10) Patent No.: US 12,578,997 B2
(45) Date of Patent: Mar. 17, 2026

(54) COMPILER-DIRECTED GRAPH-BASED COMMAND DISPATCH FOR ACCELERATORS

(71) Applicant: Advanced Micro Devices, Inc., Santa Clara, CA (US)

(72) Inventors: Anthony Gutierrez, Bellevue, WA (US); Paul Blinzer, Bellevue, WA (US); Samuel Bayliss, San Jose, CA (US); Stephen Alexander Zekany, Bellevue, WA (US); Ali Arda Eker, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 457 days.

(21) Appl. No.: 18/119,234

(22) Filed: Mar. 8, 2023

(65) Prior Publication Data

US 2024/0303113 A1    Sep. 12, 2024

(51) Int. Cl.
 *G06F 9/48*        (2006.01)
 *G06F 9/38*        (2018.01)

(52) U.S. Cl.
 CPC .......... *G06F 9/4893* (2013.01); *G06F 9/3838* (2013.01)

(58) Field of Classification Search
 CPC ..................................................... G06F 9/4893
 See application file for complete search history.

(56) References Cited

U.S. PATENT DOCUMENTS

| | | | |
|---|---|---|---|
| 2018/0349145 A1* | 12/2018 | Tye ........................ | G06F 9/3838 |
| 2021/0117238 A1* | 4/2021 | Shveidel .............. | G06F 9/4881 |
| 2023/0289215 A1* | 9/2023 | Palmer ................... | G06F 9/528 |
| 2024/0272944 A1* | 8/2024 | Cooke ................... | G06F 9/4881 |

* cited by examiner

*Primary Examiner* — Charlie Sun
(74) *Attorney, Agent, or Firm* — Patterson + Sheridan, LLP

(57) ABSTRACT

Embodiments herein describe a pull-based model to dispatch tasks in an accelerator device. That is, rather than a push-based model where a connected host pushes tasks into hardware (HW) queues in the accelerator device, the embodiments herein describe a pull-based model where a command processor (CP) loads tasks into the HW queues after any data dependencies have been resolved.

8 Claims, 4 Drawing Sheets

COMPILER-DIRECTED GRAPH-BASED COMMAND DISPATCH FOR ACCELERATORS

GOVERNMENT RIGHTS

This invention was made with U.S. Government support under Agreement No. H98230-22-C-0152 awarded by the Department of Defense. The U.S. Government has certain rights in the invention.

TECHNICAL FIELD

Examples of the present disclosure generally relate to a pull model for loading tasks into hardware queues of an accelerator device.

BACKGROUND

In current dispatch models for accelerator devices, the host is responsible for statically scheduling tasks along with barriers into task queues. The barriers indicate data dependency between different tasks. As such, when a barrier is reached in a hardware queue, the accelerator device must wait until the data dependency is resolved before the task can be dispatched to the processing units in the accelerator device. In this model it can be difficult for the push-based host to effectively schedule tasks, which can lead to load balancing and head-of-line blocking issues where a barrier blocks an entire queue which may have ready tasks behind it. The process of draining queues (i.e., moving the tasks from the queues to the processing units) can be stalled significantly due to these barriers.

Further, it is the task of the host to generate the barriers and load them in the hardware queues. The accelerator device typically has no knowledge of the data dependency, but instead merely waits for a barrier to be cleared before it dispatches the next task to its processing elements.

SUMMARY

One embodiment described herein is an accelerator device that includes processing elements, each comprising circuitry configured to perform an accelerator task; hardware queues configured to store tasks that are ready to be processed by the processing elements; and a command processor (CP). The CP includes circuitry configured to receive a task graph from a host, the task graph indicating data dependencies between the tasks, select one of the tasks, and place the selected task in one of the hardware queues after determining, using the task graph, that a data dependency corresponding to the selected task has been resolved.

Another embodiment described herein is an accelerator device that includes processing elements comprising circuitry, hardware queues configured to store tasks that are ready to be processed by the processing elements, and a CP. The CP is configured to receive a task graph from a host, the task graph indicating data dependencies between the tasks, and place the tasks in one of the hardware queues only after determining, using the task graph, that any data dependency corresponding to the tasks have been resolved.

Another embodiment described herein is a method that includes receiving, at an accelerator device, a task graph from a host, the task graph indicating data dependencies between the tasks, selecting one of the tasks, placing the selected task in a hardware queue after determining, using the task graph, that a data dependency corresponding to the selected task has been resolved, and dispatching the tasks from the hardware queue to a processing element in the accelerator device.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
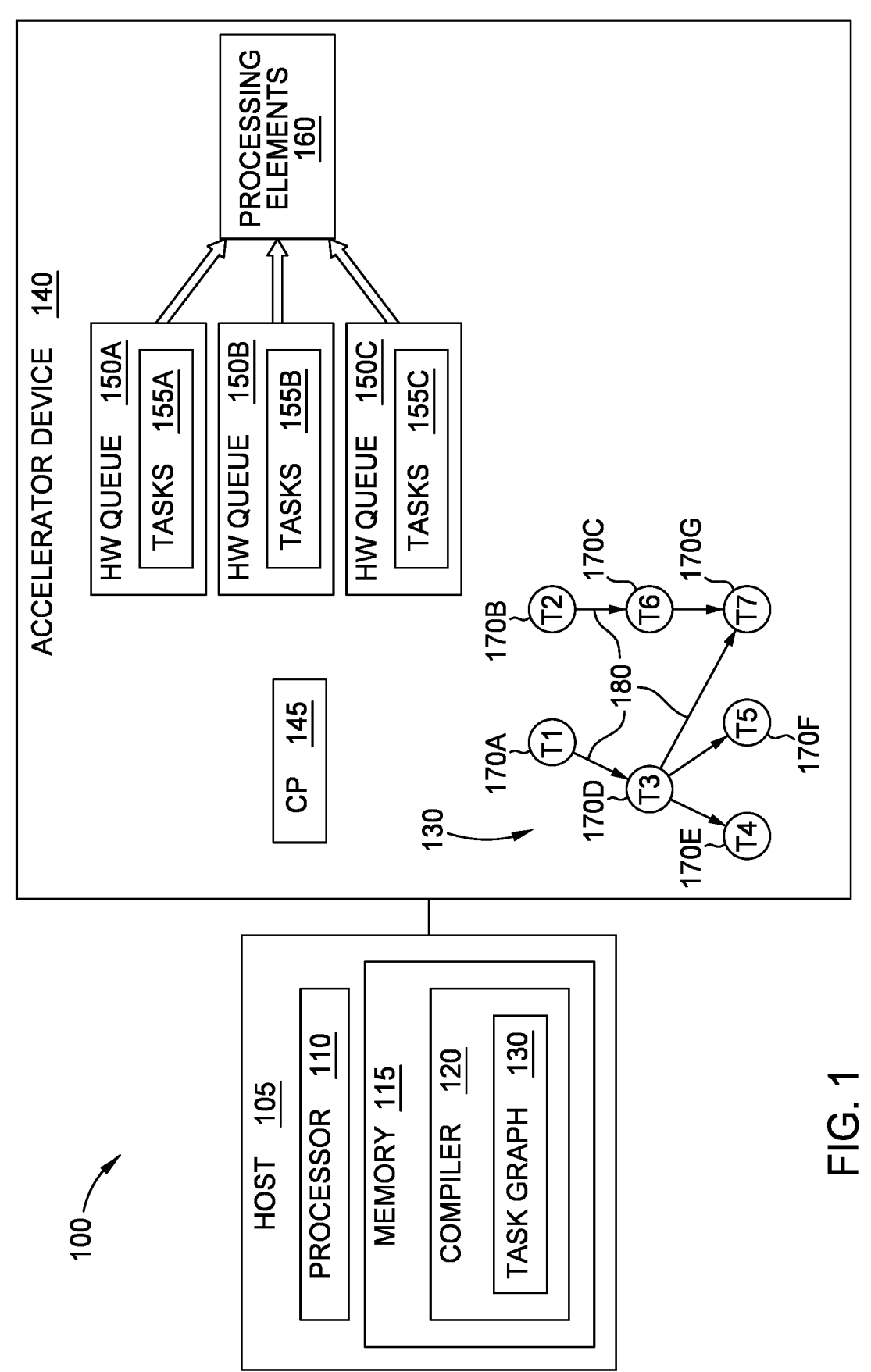
FIG. 1 is a block diagram of a computing system that uses a pull model to dispatch tasks in an accelerator device, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a pull-based model to dispatch tasks in an accelerator device. That is, rather than a push-based model where a connected host pushes tasks into hardware (HW) queues in the accelerator device, the embodiments herein describe a pull-based model where a command processor (CP) loads tasks into the HW queues after any data dependencies have been resolved. Under push-based models, the host loads barriers into the HW queues that prevent the accelerator device from dispatching any tasks in that queue until a corresponding data dependency has been resolved. In the pull-based model described herein, the host provides the CP with a task graph that indicates the data dependencies between tasks. The CP can evaluate the task graph to determine when the data dependencies for a particular task have been resolved and load the task into a HW queue. In this manner, only tasks that are ready to be executed are loaded into the queues, thereby avoiding the head-of-line blocking issues caused by the push-based model.

FIG. 1 is a block diagram of a computing system 100 that uses a pull model to dispatch tasks in an accelerator device, according to an example. As shown, the computing system 100 includes a host 105 that offloads tasks to an accelerator device 140. The host 105 includes a processor 110 which represents any number of processor elements (e.g., one or more central processing units (CPUs)). The host 105 also includes memory 115 which can include volatile or non-volatile memory elements.

The memory 115 includes a compiler 120 that generates a task graph 130 associated with tasks being offloaded to the accelerator device 140. The task graph 130 includes a plurality of nodes 170 (e.g., 170A-G in this example) that each represent a specific task (process data, move data, etc.). The nodes 170 are connected in the graph 130 by edges 180 that represent data dependencies between the tasks. For example, because there is no edge 180 between tasks T1 and T2 of the nodes 170A and 170B, these tasks can be execute in any order (or in parallel) in the accelerator device 140. However, because there is an edge 180 between the nodes 170A and 170D, this means task T1 must be completed before task T3 can be performed by the accelerator device 140. Thus, there is a data dependency between tasks T1 and T3. As part of creating the task graph 130, the compiler 120 can identify the data dependencies and then use the edges 180 to represent the order in which the tasks should be executed by the accelerator device 140.

A CP 145 receives the task graph 130 from the host 105 and then loads the tasks into hardware (HW) queues 150. The CP 145 can be a hardware state machine (e.g., specialized circuitry) or a programmable controller (e.g., circuitry) that executes firmware.

The CP 145 performs a pull-based model to load the tasks 155 defined by the nodes 170 in the task graph 130 into the HW queues 150. That is, instead of the host 105 determining when the tasks 155 are loaded into the HW queues 150 and using barriers to enforce data dependencies, the CP 145 on the accelerator device 140 can use the task graph 130 to determine when data dependencies are satisfied and then load the tasks 155 into the HW queues 150. For example, using the task graph 130, the CP 145 can determine that there is no data dependency between tasks T1 and T2 and can load them into either the same HW queue 150 or different HW queues 150. However, because there are data dependencies with tasks T3 and T6, the CP 145 does not yet loads these tasks into the HW queues 150. Instead, when tasks T1 and T2 are complete, the CP 145 can again reference the graph 130 and determine that tasks T3 and T6 can now be loaded into one of the HW queues 150.

Moreover, some tasks or nodes may have multiple data dependencies. For example, the task T7 represented by the node 170G has data dependencies with both tasks T3 and T6. Thus, the CP 145 waits until both of these tasks are complete before loading the task T7 into one of the HW queues 150. In this example, the CP 145 loads only the tasks that are ready to be executed into the HW queues 150, thereby avoiding any head-of-line congestion issues in the queues 150. Embodiments herein also reduce packet overhead by reducing the number of packets that are sent by the host 105.

The accelerator device 140 includes processing elements 160 that receive the tasks 155 from the HW queues 150. For example, a respective subset of the processing elements 160 can be assigned to a respective one of the HW queues 150. Stated differently, different portions or numbers of the processing elements 160 may be assigned to each HW queue 150. Once completed with the current task, the processing elements 160 can retrieve (or receive) another task 155 from its assigned queue 150.

The processing elements 160 can be any hardware element or circuitry for performing an accelerator task. For example, the processing elements 160 may be compute elements, data processing elements (DPEs), artificial intelligence (AI) elements, and the like. The accelerator device 140 may be a graphics processing unit (GPU), field programmable gate array (FPGA), application specific integrated circuit (ASIC), system on a chip (SoC), etc. The accelerator device 140 can include one integrated circuit or multiple integrated circuits (e.g., a base die coupled to chiplets).

In one embodiment, the processing elements 160 are arranged in an array. For example, one or more columns or rows may be assigned to a respective one of the HW queues 150. The array of processing elements 160 can include a plurality of processing elements 160 which may be arranged in a grid, cluster, or checkerboard pattern in the accelerator device 140.

In one embodiment, the processing elements 160 are identical. That is, each of the processing elements 160 (also referred to as tiles or blocks) may have the same hardware components or circuitry. Further, the embodiments herein are not limited to processing elements 160. Instead, the accelerator device 140 can include an array of any kind of processing elements, for example, the processing elements 160 could be digital signal processing engines, cryptographic engines, Forward Error Correction (FEC) engines, or other specialized hardware for performing one or more specialized tasks.

In one embodiment, the array of processing elements 160 includes processing elements 160 that are all the same type (e.g., a homogeneous array). However, in another embodiment, the array may include different types of processing elements 160. For example, the array may include digital signal processing engines, cryptographic engines, graphic processing engines, and the like.

In one embodiment, the processing elements 160 are formed from software-configurable hardened logic—i.e., are hardened. One advantage of doing so is that the processing elements 160 may take up less space in the accelerator device 140 relative to using programmable logic to form the hardware elements in the processing elements 160. That is, using hardened logic circuitry to form the hardware elements in the processing elements 160 such as program memories, an instruction fetch/decode unit, fixed-point vector units, floating-point vector units, arithmetic logic units (ALUs), multiply accumulators (MAC), and the like can significantly reduce the footprint of the array of the processing elements 160. Although the processing elements 160 may be hardened, this does not mean the processing elements 160 are not programmable. That is, the processing elements 160 can be configured when the accelerator device 140 is powered on or rebooted to perform different functions or tasks.

Figure 2:
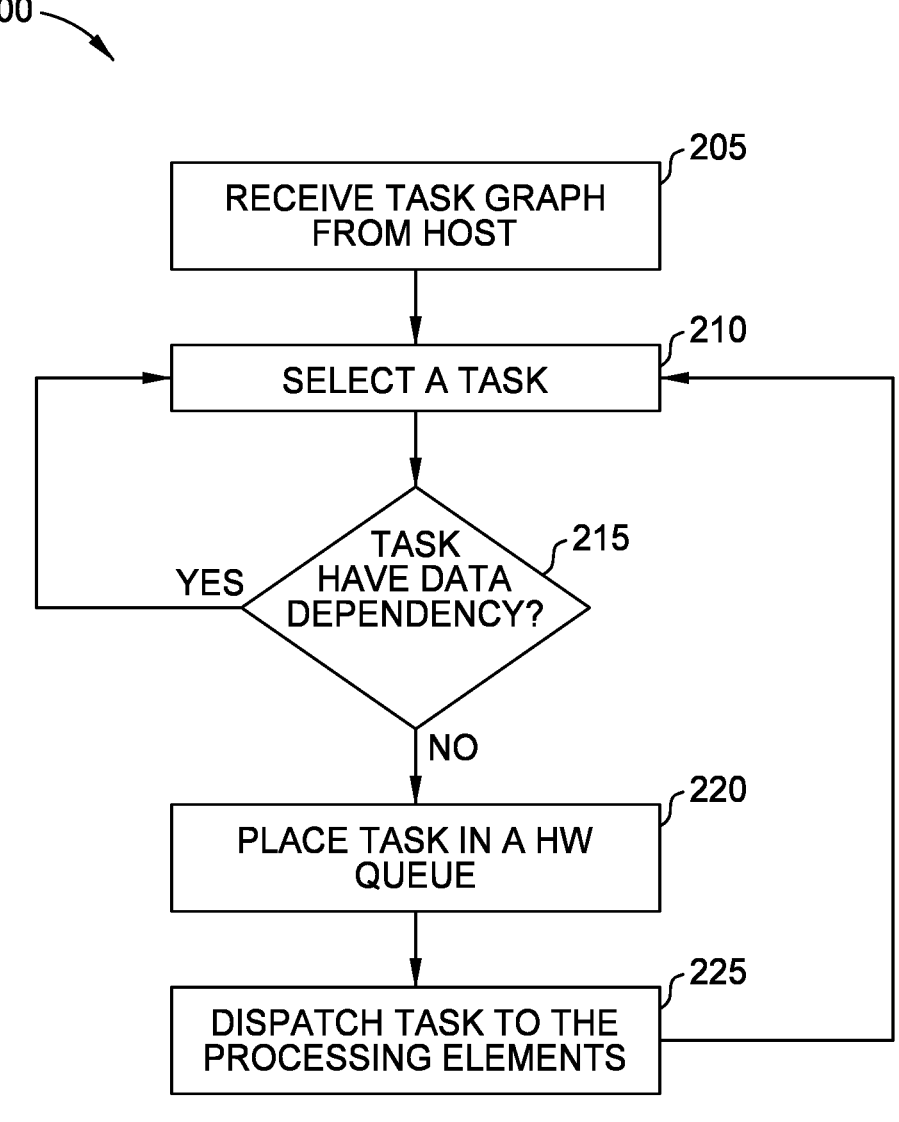
FIG. 2 is a flow chart that uses a pull model to dispatch tasks in an accelerator device, according to an example.

FIG. 2 is a flow chart of a method 200 that uses a pull model to dispatch tasks in an accelerator device, according to an example. At block 205, the CP (e.g., the CP 145 in FIG. 1) receives a task graph from the host. As described above, the compiler on the host may generate a task graph where the nodes represent the tasks the host wants to offload to the accelerator device and the edges represent data dependencies between the tasks.

At block 210, the CP selects a task from the task graph. For example, if the CP has just received the task graph, the CP may select a task associated with a node at the beginning or top of the task graph.

At block 215, the CP determines whether the selected task has a data dependency. In one embodiment, the CP evaluates the task graph to determine whether the node corresponding to the selected task has an edge (or edges) connecting it to a node (or nodes) above it in the task graph. If so, the CP determines whether the tasks for those nodes have been completed. If those tasks have been completed, this means the data dependencies have been resolved. In that case, the method 200 proceeds to block 220 where the CP places the task in a HW queue. The description below will discuss different techniques that the CP can use to select a particular HW queue to place a task.

Once in a queue, at block 225 the queues can dispatch the tasks to the processing elements for processing.

However, if the CP determines at block 215 that there remains at least one data dependency for the selected task, the CP does not load the task into a HW queue. For example, the selected task may be connected by edges to two nodes above it in the task graph. If one (or both) of the tasks associated with those two nodes is not complete, this means that the data dependencies for the selected task have not been resolved. As such, the CP does not place the task in a HW queue.

The method 200 can return to block 210 to select a task. The CP can periodically revisit previously selected tasks which were not placed or loaded into a HW queue to determine whether the data dependencies have since been resolved. Or the CP can include a special circuit or firmware routine that monitors the data dependencies and determines when they have been satisfied. This special circuit or routine can then instruct the CP to place the task in a HW queue. Regardless, the method 200 can be used to perform a pull-based model where the CP places the task in the HW queue only after their data dependencies have been resolved.

In one embodiment, tasks that are not yet ready (e.g., as determined at block 215) are temporarily stored into a sleeping queue or a pool. Thus, as the method 200 repeats, when a task becomes ready, the task can be moved from the sleep queue to the HW queues more quickly. For example, the sleeping queue can provide a buffer between a memory that stores all the tasks and the HW queues. Retrieving the ready tasks from the sleeping queue may be faster than retrieve the ready tasks from the memory.

Figure 3:
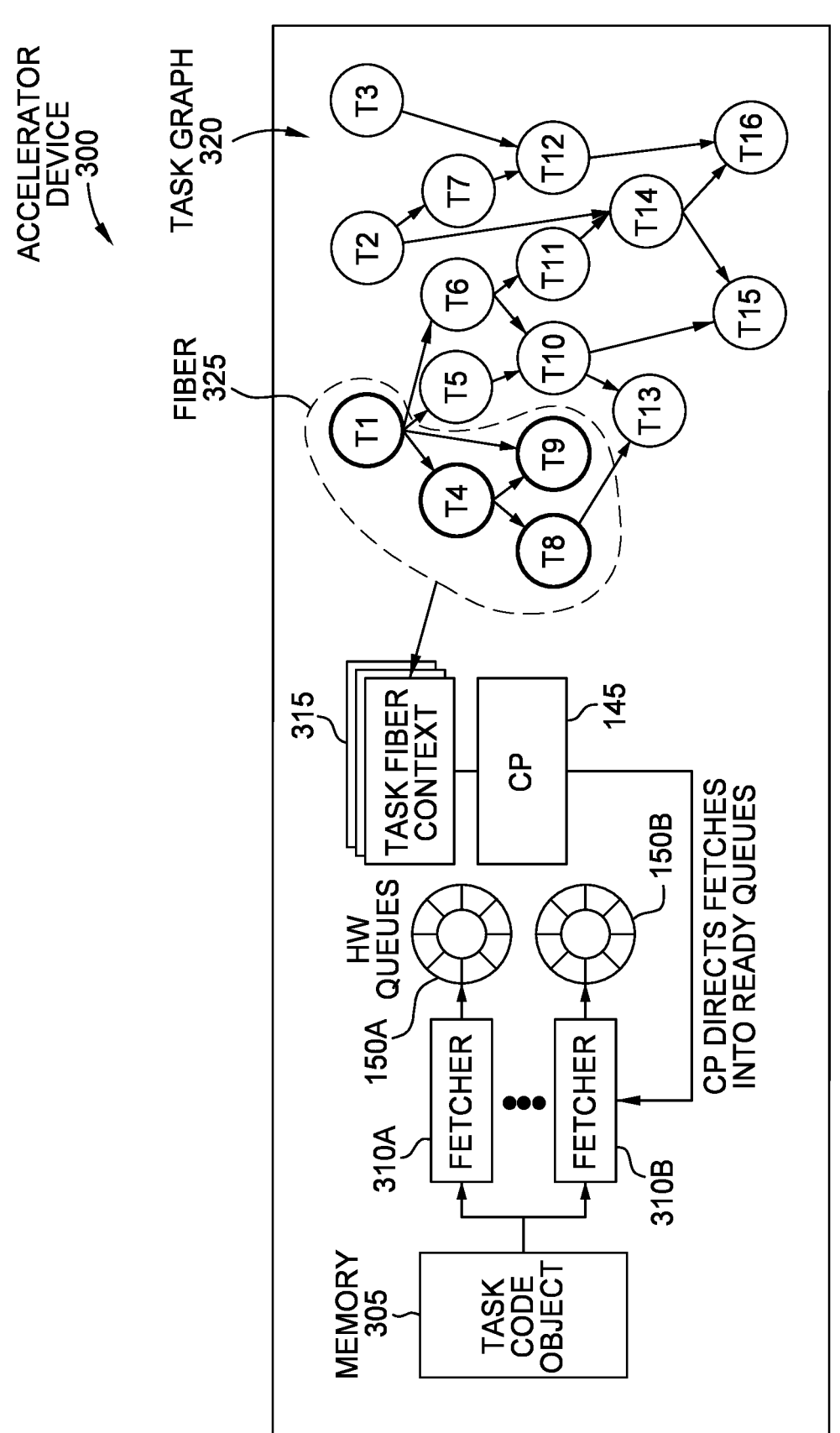
FIG. 3 is a block diagram of an accelerator device that uses a pull model to dispatch tasks, according to an example.

FIG. 3 is a block diagram of an accelerator device 300 that uses a pull model to dispatch tasks, according to an example. The accelerator device 300 includes a memory 305 (e.g., RAM) that stores the tasks before they are dispatched to the HW queues 150. The memory 305 can also store the task graph 320, which is also shown pictorially in FIG. 3.

The device 300 also includes fetchers 310A-B which can be circuitry that retrieves the tasks from the memory 305 and loads the tasks into the HW queues 150. As shown, the CP 145 is communicatively coupled to the fetchers 310 so it can control which tasks the fetchers 310 retrieve from the memory 305 and load into the HW queues 150. That is, the CP 145 can determine which tasks do not have any data dependency as discussed above, and then instruct the fetchers 310 to load those tasks into the HW queues 150.

In one embodiment, the device 300 includes a sleeping queue (not shown) for temporarily storing tasks that the CP 145 has determined are not yet ready (e.g., still have a data dependency). When the CP 145 determines the data dependencies have been resolved, it may be faster for the CP 145 to retrieve these tasks from the sleeping queue than the memory 305.

In one implementation of the graph scheduler, the host dispatches a packet to the CP 145 containing an address that allows 'fetcher' code executing on the CP 145 to perform read operations to a shared memory that traverse the task graph 320 and discover the tasks that have not yet been scheduled—i.e., placed in a queue 150. In one embodiment, a cache on the CP 145 prefetches tasks so that the latency of accesses to the shared memory containing the graph 320 does not impact dispatch performance.

An alternative implementation encodes the graph 320 such that a subgraph of the complete graph can be transmitted from the host to the CP 145 using an efficient direct memory access (DMA) copy of a single large region of memory. One method of achieving this compact encoding of a graph within a single region of memory uses 'relative' address distances (in contrast to actual addresses) to encode the relationship describing the nodes that participate in each graph edge, and the lists of edges associated with each node.

Once copied from a distant memory to a local memory (e.g., the memory 305) with low latency access from the CP 145, graph traversal operations can determine optimal dispatch of the graph to the HW queues 150.

In one embodiment, the compiler in the host can direct optimal traversal of the task graph by the CP 145 via special intermediate representation (IR) instructions that direct command dispatch. This IR can be compiled down to bytecode that can be interpreted by the firmware in the CP 145, or by compiling traversal logic down to the instruction set architecture (ISA) of the CP 145 as a function that executes when the task graph 320 is dispatched. The traversal function can also be stored in the memory 305 as part of the task graph's context.

To further optimize the task graph traversal, the compiler can break down the task graph into efficient partitions, each with their own context, that can be scheduled with no or minimal dependencies between them. FIG. 3 illustrates a fiber 325 which corresponds to a sub-portion of the nodes in the task graph 320. In one embodiment, the compiler in the host partitions the task graph 320 into multiple fibers. FIG. 3 illustrates one fiber 325, but the task graph 320 could have been divided into two, three, four, etc. fibers. Grouping the nodes in the task graph 320 into fibers 325 can make switching between ready tasks easier. The partition of tasks in FIG. 1 represent a single fiber 325 with its own task fiber context 315. If there are no cross-fiber dependencies, then the CP 145 can schedule tasks from fibers 325 whenever they have ready tasks. The compiler can optimize for fiber-level parallelism, which gives more opportunities for the CP 145 to fetch ready tasks into the queues 150. These various techniques allow for compiler-based graph traversal optimizations to be applied and used to direct the CP on how best to traverse the task graph.

As discussed above, the task graph 320 contains edges denoting temporal dependencies between operations. These edges (between a source and destination node) can denote "source task may start after destination task signals completion". An additional feature could be to encode other information in the graph 320 to aid decision making by the dispatcher/scheduler in the CP 145. One example of this additional information is adding "Affinity Edges" to the graph 320. These affinity edges denote that tasks should be executed on the same resource (or by extension, the same resource group). The CP 145 can observe these edges inserted by the compiler and ensure that task scheduling is compliant with these policies. For example, if an edge in the task graph 320 indicates an affinity between two tasks, the CP 145 may place these tasks in the same HW queue 150 so they are executed using the same processing elements.

Another additional feature that could be encoded into the edges of the task graph 320 includes "co-operative" edges with co-operative parameters that ensure that tasks are scheduled to run simultaneously so that some form of fine-grained synchronization (e.g. produced-consumer relationship) is observed and the related nodes are either non-preemptable, or can only be pre-empted as a group. In this example, the CP 145 can place the tasks in the queues 150 so the tasks are executed in parallel by the processor elements.

Providing the CP 145 with an entire task graph 320 (or a subgraph such as a fiber) allows for dynamic load-balancing to be performed at runtime in response to quality of service (QoS) concerns. For example, a task graph observed at runtime to have disproportionately high latency and occupation of hardware resources can be dynamically deprioritized by the CP 145 (e.g., assigned a lower priority) to minimize the effect on other task graphs. Task graphs may have bottleneck dependencies, such as many parallelizable tasks which must be performed prior to a single successor task. In that case, it may be optimal for the CP 145 to schedule many of these tasks in parallel before considering other task graphs.

Further, knowledge of the cardinality and structure of the task graph 320 enables runtime optimizations related to the allocation of hardware resources. For example, dispatching of a large task graph may result in bringing certain hardware resources out of a low-power state. But if the CP 145 can quickly traverse the task graph 320 and determine that the opportunities for parallelization are minimal, it can instead save energy by choosing not to allocate those additional hardware resources. For example, the CP 145 may place the ready tasks in a sub-portion of the available HW queues while the remaining HW queues (and their assigned processing elements) are left in a low power state.

In one embodiment, the CP 145 schedules task graphs 320 dispatched from several isolated user processes. Different embodiments might interleave these processes either in a fine-grained manner (dispatching tasks from multiple subgraphs simultaneously) or a coarse-grained manner (completing the dispatch of tasks in one isolated subgraph, before proceeding to another). The CP 145 may incorporate QoS that adjusts the proportion of tasks scheduled from one specific subgraph based on a measured completion time and/or additional information about latency requirements delivered by the compiler and/or runtime. Thus, the CP 145 can place tasks for different user processes (e.g., different applications or different virtual machines) in the same HW queues 150 at the same time and still provide the desired QoS metrics. This avoids having to flush out the tasks in the HW queues 150 when switching between different user processes. It also allows for better QoS in virtualized environments with shared work queues because tasks are not blocked by another process's barriers.

Another optimization that can be applied is resource reallocation. For example, in cases where tasks are fine-grained units of work part of broader kernels (e.g., workgroups within a kernel) the compiler can insert special instructions to the CP 145 to adjust the resource allocation on the accelerator hardware, such as a register file or scratch memory space. This can make more efficient use of resources as requirements change over the lifetime of a task or graph's execution.

Because the compiler has a greater knowledge about what computation a task executes (e.g., its memory characteristics, etc.), the compiler can provide several optimizations. For example, the compiler can leverage profiling information based on a task's memory regularity, compute latency, communication patterns, etc., to understand the critical path in the task graph 320. The compiler can assign priorities to individual fibers based on their criticality, which can then be communicated to the CP 145 to ensure QoS or real-time latency guarantees are met.

Additionally, the compiler can schedule effective prefetches of tasks into the ready queues. This can be done speculatively. For example, by understanding the typical latency of a given task, the compiler can schedule a timely prefetch of its dependencies into the ready queue with a barrier packet if necessary. This may have much less impact than static scheduling from the host because the CP has knowledge of when to prefetch. Alternatively, the CP 145 could speculatively prefetch a task into the queues 150 and in the unlikely event that a task's dependencies are not resolved by the time it gets to the head of the queue it can be dequeued and rescheduled for later.

Figure 4:
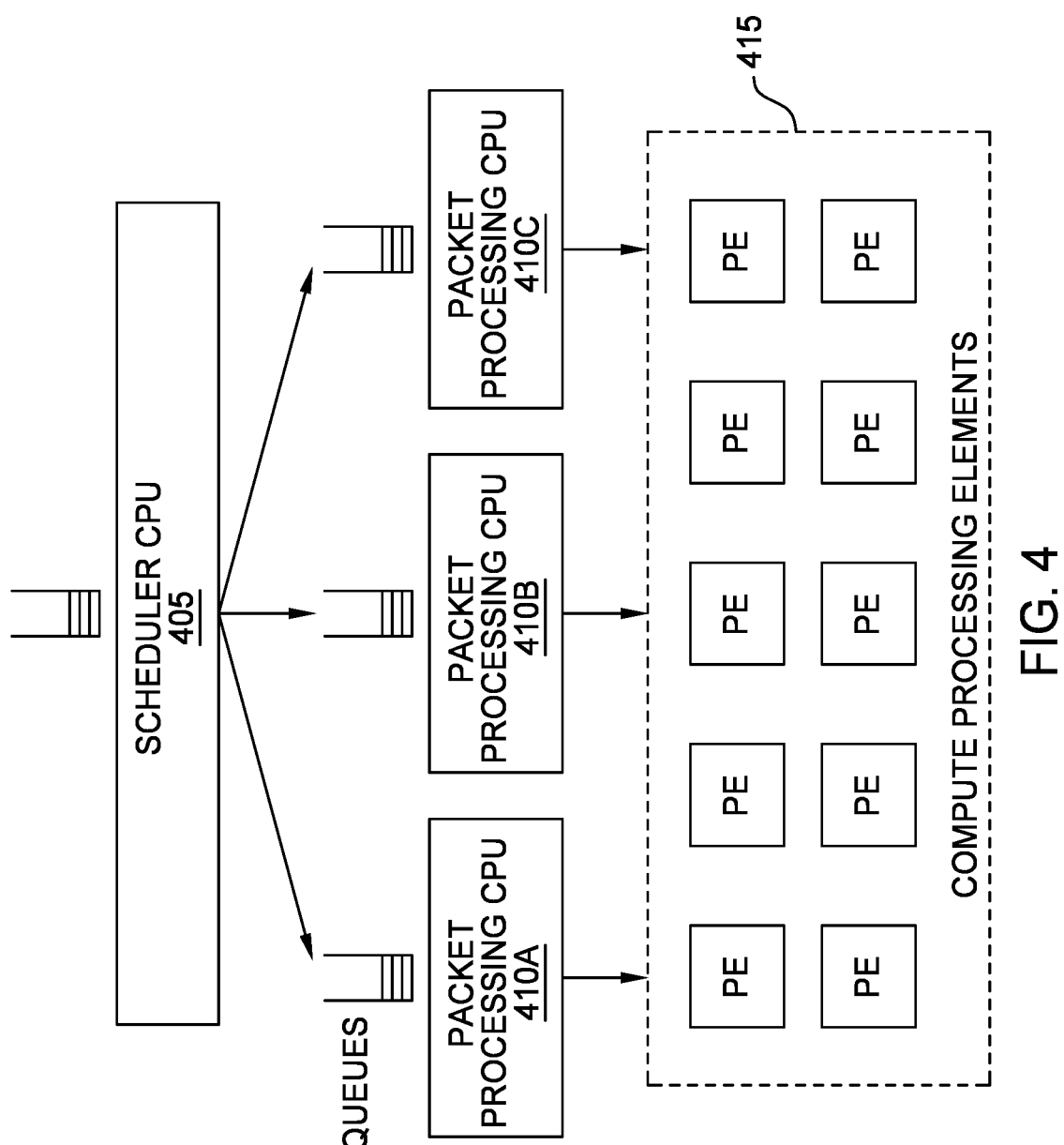
FIG. 4 illustrates using hierarchical control to dispatch tasks in an accelerator device, according to an example.

FIG. 4 illustrates using hierarchical control to dispatch tasks in an accelerator device, according to an example. In this example, a hierarchy of CPUs can be used to offload the scheduling and dispatch of tasks within a task graph from a host so that they are scheduled on compute processing elements (e.g., the processing elements 160 in FIG. 1). In one example configuration, a host CPU forms a task graph and dispatches it to the accelerator device in the form of an asynchronously dispatched instruction (e.g., an Architected Queuing Language (AQL) agent packet dispatched in a queue). The queue can be serviced by a scheduler CPU 405 that determines how parallel subgraphs from that larger graph can be dispatched to a lower hierarchy of packet processing CPUs 410A-C which is able to schedule work to either the complete array 415 of processing elements (PEs), or to a subset of resources in the array 415 (e.g., a particular row or column of the PEs). Those subgraphs might either be dispatched as separate tasks into a queue for processing at each packet processing CPU 410 or dispatched as a subgraph for scheduling at that lower level of hierarchy.

In one embodiment, the scheduler CPU 405 may be a CPU in the host while the packet processing CPUs 410 are in the accelerator device. Further, the packet processing CPUS 410 may be part of the same CP in the accelerator device, or may be implemented using distributed (and distinct) CPs in the accelerator device. In another embodiment, the scheduler CPU 405 and the packet processing CPUs 410 may be implemented using one, or multiple CPs in the accelerator device. If the accelerator device includes multiple chiplets, each of the packet processing CPUs 410 may be used to assign tasks to processing elements in a respective one of the chiplets.

As opposed to a hierarchical model, a CP complex can be designed to have a diverse set of distinct micro-controllers. For example, the CP complex can contain multiple fetch engines that move data, synchronization engines that resolve dependencies, scheduling engines for domain-specific scheduling decisions or signaling engines that track the completion of tasks, etc. Additionally, security or compression engines can also be added to implement non-dispatch features.

The embodiments herein also enable a heterogeneous CP design which in turn can also accelerate the processing of dynamic graphs in which tasks are created, enqueued and resolved on the fly. That is, the CP can include different, heterogeneous circuitry that perform different task. Instead of returning the control back to the host, the CP can enqueue, track and resolve the dynamic tasks.

As described above, the pull-based model offloads scheduling decisions from host to the CP. This saves host core cycles and allows CP to implement a fine-grained task scheduling algorithm while supporting a balanced and locality-friendly execution.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An accelerator device, comprising:
processing elements, each comprising circuitry configured to perform an accelerator task;
hardware queues configured to store tasks that are ready to be processed by the processing elements; and
a command processor (CP) comprising circuitry configured to:
    receive a task graph from a host, the task graph indicating data dependencies between the tasks,
    select one of the tasks, and
    place the selected task in one of the hardware queues after determining, using the task graph, that a data dependency corresponding to the selected task has been resolved, wherein the CP is configured to place tasks associated with different user processes in the hardware queues at the same time based on a desired quality of service (QoS).

2. The accelerator device of claim 1, wherein the CP is configured to:
select a second one of the tasks,
determine, using the task graph, that a data dependency corresponding to the second task has not been resolved, and p1 determine not to place the second task in one of the hardware queues.

3. The accelerator device of claim 1, wherein the CP is configured to ensure that only tasks placed in the hardware queues are tasks that have no data dependencies or whose data dependencies have been resolved.

4. The accelerator device of claim 1, wherein the task graph comprises nodes and edges that couple the nodes, wherein each node represents one of the tasks and each edge represents a data dependency between two nodes.

5. The accelerator device of claim 1, wherein the CP comprises a hierarchy of central processing units (CPUs).

6. An accelerator device, comprising:
processing elements, each comprising circuitry configured to perform an accelerator task;
hardware queues configured to store tasks that are ready to be processed by the processing elements; and
a command processor (CP) comprising circuitry configured to:
    receive a task graph from a host, the task graph indicating data dependencies between the tasks, wherein the task graph comprises nodes and edges that couple the nodes, wherein each node represents one of the tasks and each edge represents a data dependency between two nodes, wherein the edges further encode at least one of an affinity between two nodes indicating the two nodes should be executed on a same processing element or a co-operative parameter indicating the two nodes should be executed in parallel by the processing elements,
    select one of the tasks, and
    place the selected task in one of the hardware queues after determining, using the task graph, that a data dependency corresponding to the selected task has been resolved.

7. An accelerator device, comprising:
processing elements, each comprising circuitry configured to perform an accelerator task;
hardware queues configured to store tasks that are ready to be processed by the processing elements; and
a command processor (CP) comprising circuitry configured to:
    receive a task graph from a host, the task graph indicating data dependencies between the tasks, wherein the task graph is partitioned into a plurality of fibers by a compiler on the host,
    select one of the tasks, and
    place the selected task in one of the hardware queues after determining, using the task graph, that a data dependency corresponding to the selected task has been resolved.

8. The accelerator device of claim 7, wherein the CP is configured to prioritize one of the plurality of fibers over another one of the plurality of fibers based on profiling information associated with the plurality of fibers.

* * * * *